United States Patent
Johnson et al.

(10) Patent No.: US 7,148,681 B2
(45) Date of Patent: *Dec. 12, 2006

(54) PROXIMITY SENSOR DEVICE THAT DETERMINES AT LEAST ONE PHYSICAL CHARACTERISTIC OF AN ITEM

(75) Inventors: Richard R. Johnson, Ann Arbor, MI (US); Stephen M. Graff, Maumee, OH (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/118,547

(22) Filed: Apr. 29, 2005

(65) Prior Publication Data

US 2005/0184728 A1   Aug. 25, 2005

(51) Int. Cl.
*G01B 7/14* (2006.01)
*G01B 7/06* (2006.01)
(52) U.S. Cl. .................. 324/207.26; 324/229; 324/239
(58) Field of Classification Search ........... 324/207.26, 324/229, 239, 230, 231, 226
See application file for complete search history.

(56) References Cited

U.S. PATENT DOCUMENTS

| | | | | |
|---|---|---|---|---|
| 3,707,672 A | * | 12/1972 | Miller et al. | 324/239 |
| 3,763,424 A | * | 10/1973 | Bennett, Jr. et al. | 324/239 |
| 4,006,405 A | * | 2/1977 | Greenwood et al. | 324/227 |
| 4,425,511 A | * | 1/1984 | Brosh | 307/106 |
| 4,666,027 A | * | 5/1987 | Ostroski et al. | 194/203 |
| 4,737,698 A | * | 4/1988 | McMullin et al. | 318/653 |
| 5,283,520 A | * | 2/1994 | Martin et al. | 324/220 |
| 6,424,145 B1 | * | 7/2002 | Woolsey et al. | 324/202 |
| 6,602,724 B1 | * | 8/2003 | Redeker et al. | 438/5 |
| 6,617,845 B1 | * | 9/2003 | Shafiyan-Rad et al. | 324/207.16 |

* cited by examiner

*Primary Examiner*—Jay M. Patidar
(74) *Attorney, Agent, or Firm*—Carlson, Gaskey & Olds

(57) ABSTRACT

A sensor device includes the ability to determine part presence and at least one physical characteristic of the part. A drive coil and sense coil are arranged so that a voltage applied across the drive coil causes a response in the sense coil, which is influenced by the presence of the item of interest. In a first mode, a controller determines whether the item is present by determining an amount of coupling between the drive coil and the sense coil, which is indicative of whether a part is present near the sense coil. In a second mode, the controller determines an amount of magnetic flux that is indicative of a thickness of the material. In another mode, constant current applied to the drive coil instigates a voltage across both coils. The amplitude of the sense coil voltage and a phase shift of the sense coil voltage relative to the drive coil voltage provides material thickness information.

8 Claims, 4 Drawing Sheets

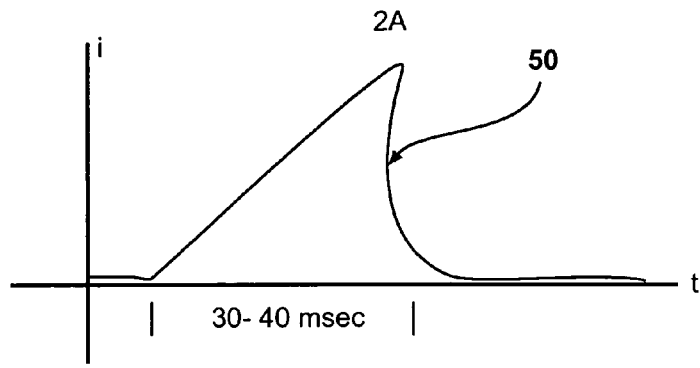
FIG - 3A Drive Coil Current
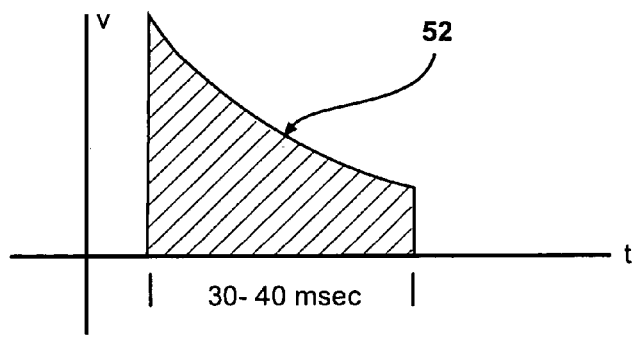
FIG - 3B Sense Coil Voltage
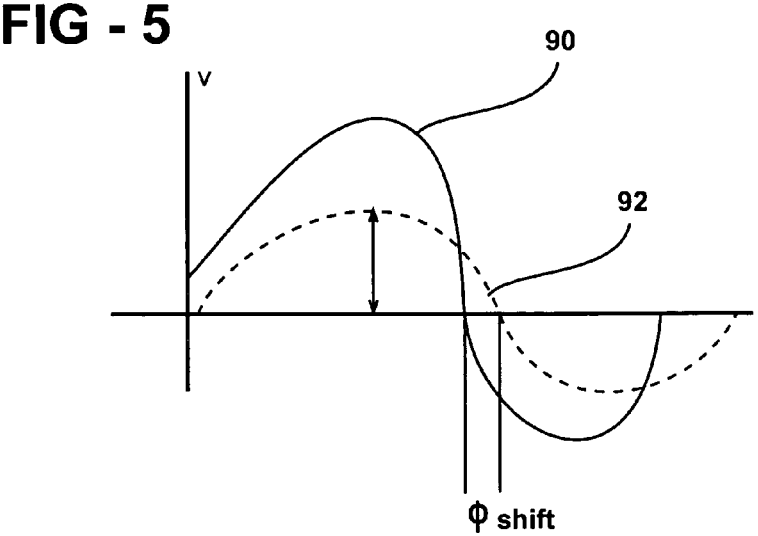
FIG - 5
φ shift

PROXIMITY SENSOR DEVICE THAT DETERMINES AT LEAST ONE PHYSICAL CHARACTERISTIC OF AN ITEM

BACKGROUND OF THE INVENTION

This invention generally relates to proximity sensors. More particularly, this invention relates to a proximity sensor device that is also capable of determining at least one physical characteristic of the item of interest.

Proximity sensors are used in manufacturing and material handling applications for detecting the presence or placement of metal work pieces. Generally, proximity sensors generate a magnetic field from an inductor coil. When a metal work piece is brought into the magnetic field emitted from the sensor, eddy current losses in the metal work piece cause the impedance of the inductor coil to decrease. The decrease in impedance of the inductor coil is detected in appropriate circuitry that indicates the presence of the metal work piece in the magnetic field.

Common sensor arrangements typically include separate sensors for detecting the presence of a part and separate sensors for determining physical characteristics of the part, such as material thickness. Other sensor arrangements include proximity sensors that have switch actuated components that require physical contact with the part to determine one or more features of the part.

A disadvantage associated with current systems is that a plurality of individual sensors are required. Those skilled in the art are always striving to make improvements and to enhance the available technology.

This invention addresses the need for simplifying the overall sensor arrangement by integrating multiple functions into a single sensor device.

SUMMARY OF THE INVENTION

In general terms, this invention is a device for sensing the presence of an item and at least one physical characteristic of the item. The inventive device includes a power source and a drive coil that is selectively coupled to the power source. A sense coil is associated with the drive coil such that the sense coil responses to a voltage applied to the drive coil by the power source. The sense coil is influenced by the presence of an item near to the sense coil. A processor processes an output from the sense coil in a first mode to make a determination whether an item is present near the sensing device. The processor also processes an output from the sense coil in a second mode to make a determination regarding at least one physical characteristic of the item. In the preferred embodiment, the determined physical characteristic is the thickness of the material.

The various features and advantages of this invention will become apparent to those skilled in the art from the following detailed description of the currently preferred embodiment. The drawings that accompany the detailed description can be briefly described as follows.

BRIEF DESCRIPTION OF THE DRAWINGS

FIG. 3A is a graphical plot of a sample drive coil current used in connection with this invention.

FIG. 3B is a graphical plot of a sense coil voltage that corresponds to the drive coil current of FIG. 3A.

FIG. 5 is a graphical plot of a feature of one example embodiment of this invention.

DETAILED DESCRIPTION OF THE PREFERRED EMBODIMENT

Figure 1:
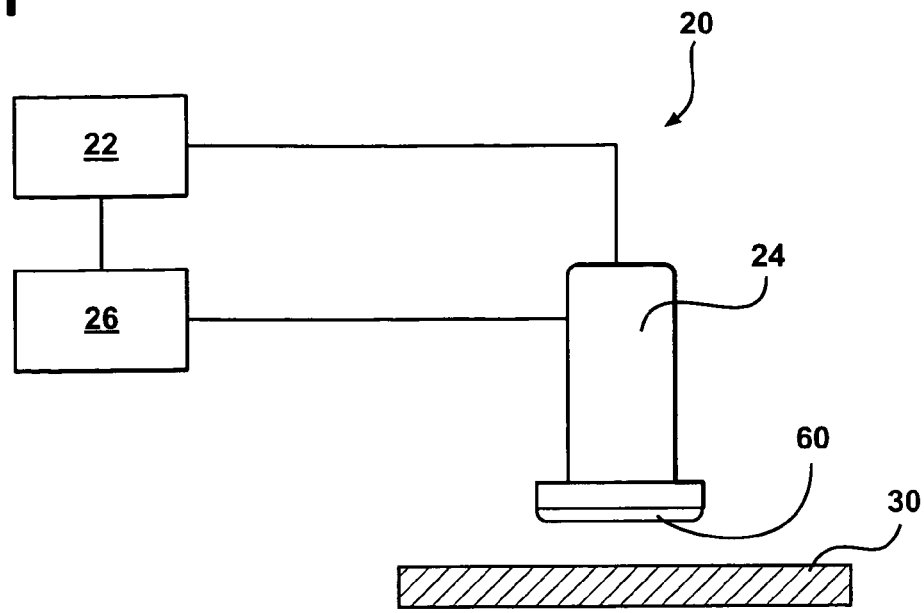
FIG. 1 schematically illustrates a system designed according to this invention.

A sensing device 20 includes a power module 22 and a sensor 24. A controller 26 processes an output from the sensor 24 to determine the presence and at least one physical characteristic of an item 30. The controller 26 preferably determines a thickness of the material of the item 30.

Although an individual power module 22 and an individual controller module 26 are schematically illustrated, multiple components or multiple controllers can be used to achieve the results provided by the illustrated power and controller modules. Individual modules are shown for simplicity of discussion purposes.

Figure 2:
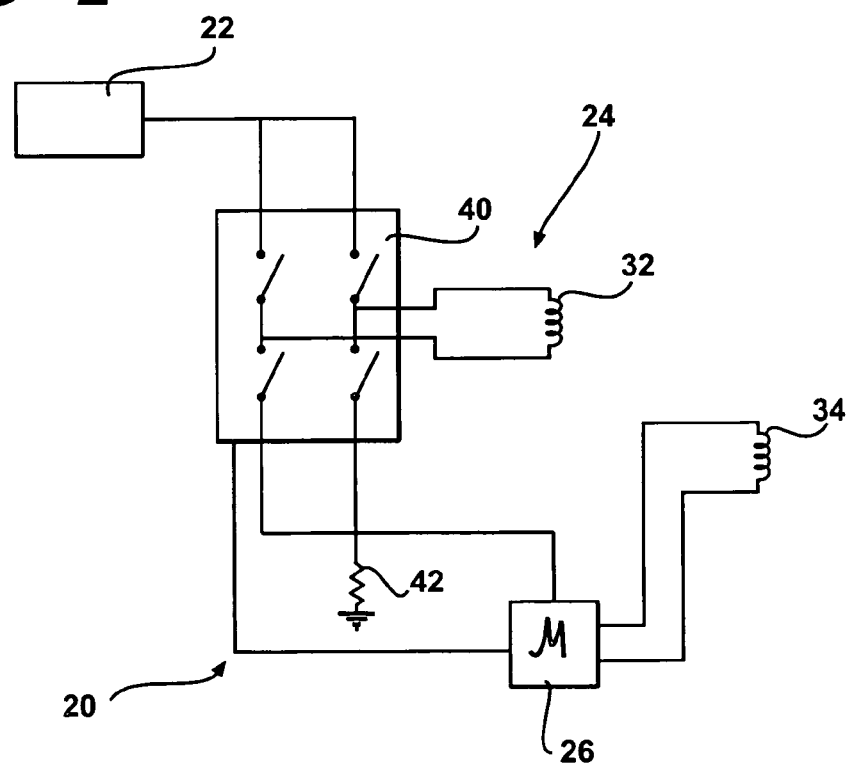
FIG. 2 schematically illustrates more detail of a sensor arrangement designed according to this invention.

FIG. 2 schematically illustrates in somewhat more detail the sensor device 24 portion of the system 20. The sensor device 24 preferably includes a drive coil 32 that is powered by the power module 22. A sense coil 34 is associated with the drive coil 32. The sense coil 34 responds to a voltage across the drive coil 32. The sense coil 34 response further is influenced by the presence and composition of the item 30 near the sensor device 24. For example, the presence of a ferrous material item 30 alters the magnetic coupling of the coils.

The illustrated example includes an H-bridge switching arrangement 40 for selectively coupling the drive coil 32 to the power module 22. The illustrated example also includes a current indicating element 42 for indicating an amount of current flowing through the drive coil 32. The controller 26 is illustrated as being able to receive outputs from the sense coil 34, the current indicator 42 and to control the operation of the switching arrangement 40. Alternatively, these functions may be accomplished by more than one microprocessor.

The controller 26 preferably operates in more than one mode. In a first mode, the controller determines whether the part or item 30 is present near the sensing device 24. In one example this first mode includes a voltage from the power module 22 that is applied to the drive coil 32 for a relatively short period of time. A relatively small pulse that will not saturate the item 30 is preferred. In one example, the voltage is applied to the drive coil 32 for approximately 600 microseconds. During this time, a voltage across the sense coil 34 is determined by the controller 26. Under such conditions the sense coil voltage indicates the amount of coupling between the drive coil 32 and the sense coil 34. The amount of coupling between the coils depends on whether an item 30 is present within the sensor range. Whenever the amount of coupling reaches a determined threshold, the controller 26 determines that an item 30 is present.

In a second mode of operation, the controller 26 determines at least one physical characteristic of the item 30. One example physical characteristic is a thickness of a sheet of material. In this second mode, a voltage from the power module 22 is applied across the drive coil 32 through the H-bridge switch arrangement 40. This results in a voltage in the sense coil that is measured by the controller 26. The preferred arrangement includes an analog-to-digital converter either within or as a separate component from the controller 26.

During this second mode of operation a voltage across the current indicator element 42 is measured until the current flowing through the drive coil 32 reaches a determined threshold level. The determined threshold level preferably corresponds to a level where the item 30 is magnetically saturated. In one example, an analog voltage comparator with a digitally adjustable threshold provides a signal indicating when the current level reaches the threshold. Depending on the item of interest and the specific sensor arrangement, those skilled in the art who have the benefit of this description will be able to determine appropriate current or voltage levels to make a determination. The controller 26 preferably is programmed to recognize the appropriate thresholds for appropriate circumstances.

During the time that the drive coil 32 is energized until the threshold current is achieved, the voltage across the sense coil 34 is measured periodically and preferably digitally integrated. At the end of the measurement period (i.e., when the item 30 becomes magnetically saturated), the integrated value of the voltage across the sense coil 34 is determined. The integrated value provides a measure of the magnetic flux with the item 30 present. The magnetic flux measure provides a measure of the thickness of the material of the item 30. This example is particularly suited for measuring the thickness of a ferrous item.

FIG. 3A illustrates a current across the drive coil 32 during a thickness determination. An illustrated example includes a current 50 indicating a current rise for a period of approximately 40 milliseconds to a level of approximately 2 amps. FIG. 3B shows a corresponding voltage across the sense coil 34. The plot 52 shows voltage versus time over the same 40 millisecond time period. The integrated area underneath the curve 52 provides the value that is an indication of the material thickness.

By operating in two different modes, the controller 26 provides both part presence and physical characteristic information. This provides significant advantages compared to previous systems where multiple sensors for such arrangements were required.

A system designed according to this invention may also be capable of operating in a third mode. In one example, a third mode of operation enables the inventive device to measure the presence and thickness of an item 30, whether the item is ferrous or non-ferrous. In this example, an AC constant current source of a chosen frequency is applied to the drive coil 32. An example illustration of a voltage across the drive coil 32 as a result of such a constant current source is shown at 90 in FIG. 5.

A corresponding voltage across the sense coil 34 is shown at 92. As can be appreciated from FIG. 5, the voltage across the sense coil has a different amplitude than the voltage 90 across the drive coil 32. Additionally, the voltage across the sense coil 34 is phase shifted relative to the drive coil signal. The amount of phase shift is indicative of the thickness of the material. Determining the magnitude of the phase shift and the amplitude of the sense coil signal 92 provides information regarding the material thickness. In one example, locating the zero crossings of the sense coil voltage 92 relative to the zero crossings of the drive coil voltage provides an indication of the phase shift relationship between the coil signals. Given this description, those skilled in the art will be able to suitably program a controller to use such information to make the material thickness determination to meet the needs of their particular situation.

This third mode of operation is particularly useful for making determinations regarding parts of interest that are non-ferrous.

Figure 4A:
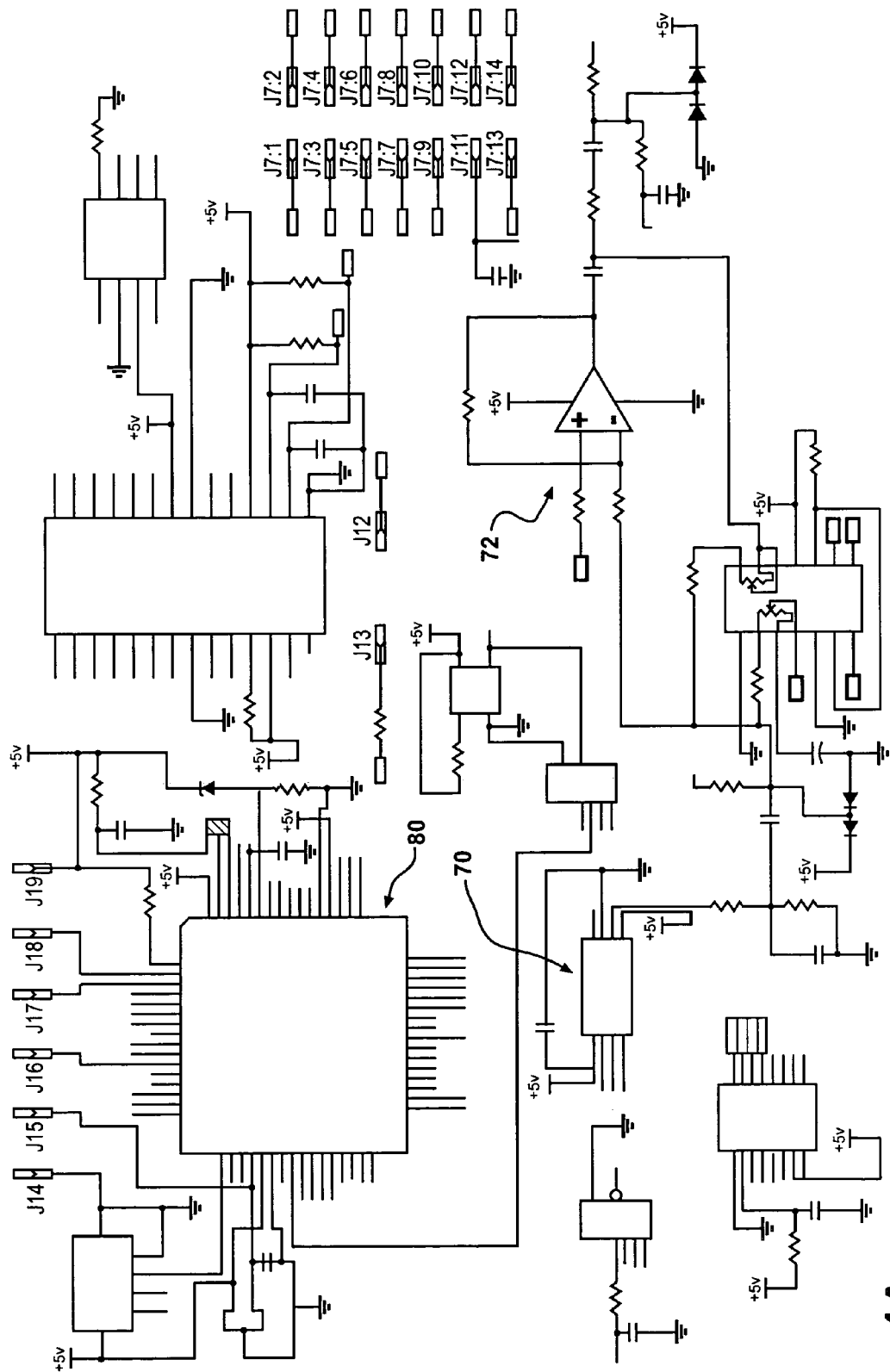
FIG. 4A schematically illustrates a portion of a system designed according to this invention.
Figure 4B:
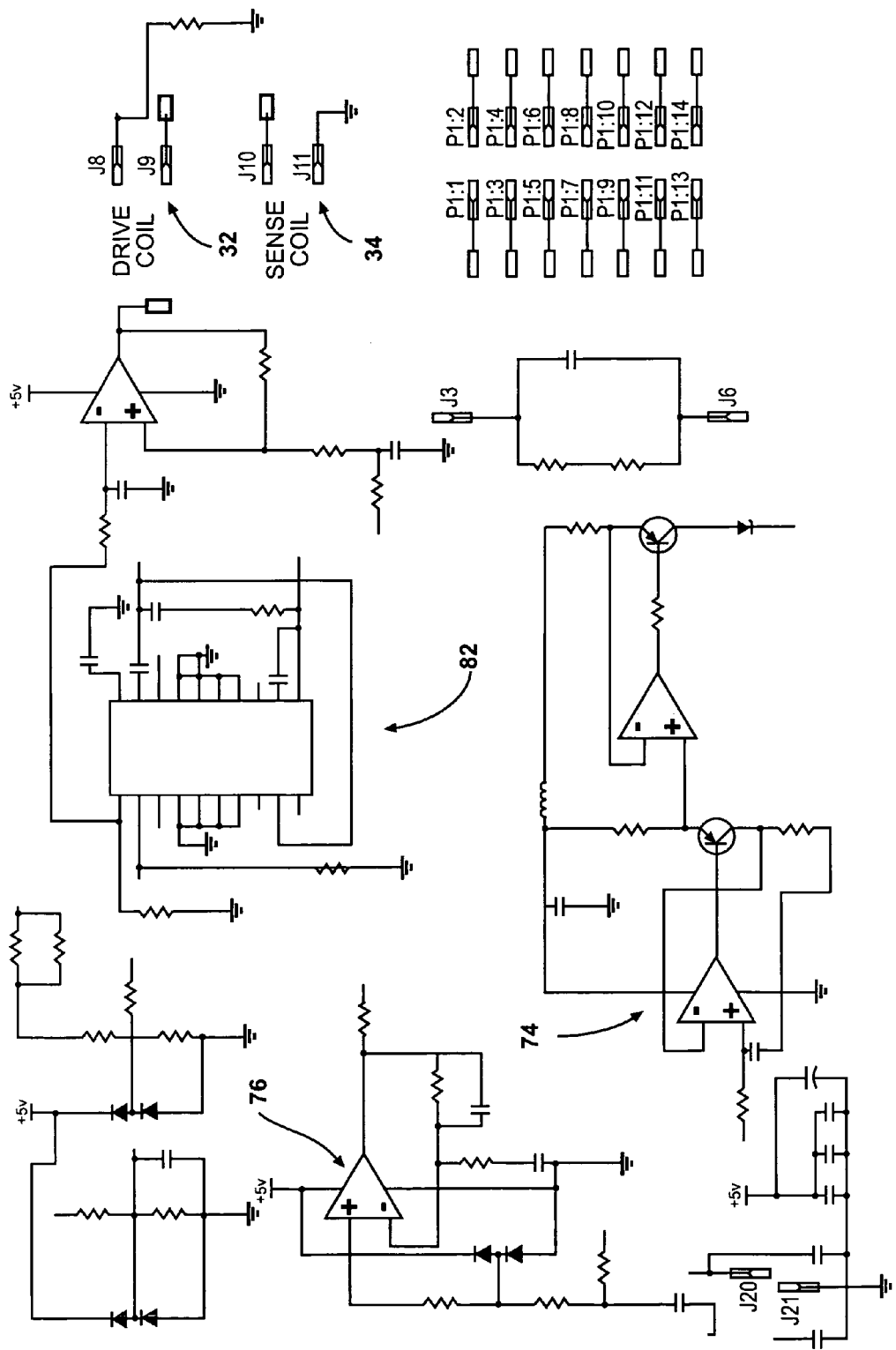
FIG. 4B schematically illustrates another portion of the embodiment of FIG. 4A.

FIGS. 4A and 4B schematically illustrate one example of a system designed according to this invention. In the illustrated example, a digital sine generator 70 signal is passed through a phase shifter portion 72. A current driver portion 74 is used to drive the drive coil 32 for determining whether a part is present. The signals are preferably processed using a band pass filter and amplifier arrangement 76. The output signals (AINO and AINI) preferably are processed using an analog comparator in the chip 80.

When determining material thickness for example determinations, the drive coil 32 preferably is driven by an H-bridge switch arrangement within the chip 82. In the second mode, the sense coil output preferably is read directly by an analog to digital converter in the chip 80. During the second mode in this example, the amplitude and phase shift information of the sense coil voltage provides the information used to determine part thickness, for example.

Another advantage of this invention is that a face portion 60 of the sensor preferably includes a solid metal plate. In one example, a stainless steel plate is used. The plate preferably is solid and does not include any openings or breaks so that the sensor components are better protected than in previous designs.

With previous arrangements, for example, a physical limit switch was included that had to make physical contact with the item 30 during a measurement procedure. The physical contact switch typically required at least one opening through a face portion of the sensor device, which left sensor components subject to possible exposure or contamination. Therefore, a device designed according to this invention includes the further advantage of providing a more robust system that is less susceptible to contamination or other damage during measurement procedures.

The preceding description is exemplary rather than limiting in nature. Variations and modifications to the disclosed example may become apparent to those skilled in the art that do not necessarily depart from the purview and spirit of this invention. The scope of legal protection given to this invention can only be determined by studying the following claims.

The invention claimed is:

1. A device for sensing the presence and at least one physical characteristic of an item, comprising:
   a drive coil;
   a sense coil associated with the drive coil such that the sense coil is responsive to a voltage applied to the drive coil and influenced by the presence of an item near to the sense coil; and
   a processor that processes an output from the sense coil in a first mode to make a determination whether an item is present near the sensing device and in a second mode to make a determination regarding a thickness of the item from a phase relationship between the drive coil voltage and the sense coil voltage.

2. The device of claim 1, wherein the processor determines a value of a voltage across the sense coil to determine an amount of coupling between the drive coil and the sense coil to determine whether the item is present near the sensing device.

3. The device of claim 1, wherein the processor determines a voltage associated with the drive coil responsive to a current having a selected frequency applied to the drive coil, an amplitude of a voltage associated with the sense coil and a phase relationship between the drive coil voltage and the sense coil voltage and wherein the processor uses at least the determined phase relationship to make the thickness determination.

4. The device of claim 1, wherein the voltage applied to the drive coil associated with the first mode comprises a pulse that will not magnetically saturate the item.

5. A device for sensing the presence and at least one physical characteristic of an item, comprising:
 a drive coil;
 a sense coil associated with the drive coil such that the sense coil is responsive to a voltage applied to the drive coil and influenced by the presence of a ferrous item near to the sense coil;
 a processor that processes an output from the sense coil in a first mode to make a determination whether an item is present near the sensing device and in a second mode to make a determination regarding the physical characteristic of the item; and
 a face portion supported on the sensing device that is adapted to be positioned near the item and wherein the face portion is a solid metal plate.

6. A method of sensing the presence of an item and determining at least one physical characteristic of the item using a sensing device having a drive coil and an associated sense coil, comprising the steps of:
 applying a current of a selected frequency to the drive coil;
 determining a voltage associated with the drive coil;
 determining an amplitude of a voltage associated with the sense coil;
 determining a phase shift relationship between the drive coil voltage and the sense coil voltage; and
 determining a thickness of the item using at least the determined phase shift relationship.

7. The method of claim 6, wherein the item comprises a non-ferrous material.

8. The method of claim 6, wherein determining the phase shift relationship includes locating zero crossings of the sense coil voltage and comparing the located zero crossings to zero crossings of the drive coil voltage.

* * * * *

UNITED STATES PATENT AND TRADEMARK OFFICE
CERTIFICATE OF CORRECTION

| | | |
|---|---|---|
| PATENT NO. | : 7,148,681 B2 | Page 1 of 1 |
| APPLICATION NO. | : 11/118547 | |
| DATED | : December 12, 2006 | |
| INVENTOR(S) | : Johnson et al. | |

It is certified that error appears in the above-identified patent and that said Letters Patent is hereby corrected as shown below:

ON THE TITLE PAGE:

Please insert:

(63) Continuation of application No. 10/060,440, filed on January 30, 2002, now Patent No. 6,949,925.

Signed and Sealed this

Twenty-sixth Day of June, 2007

JON W. DUDAS
*Director of the United States Patent and Trademark Office*